Dec. 23, 1941.    J. M. LARSON    2,266,772
TEMPERATURE CONTROL SYSTEM
Filed Jan. 6, 1937    6 Sheets-Sheet 1

Dec. 23, 1941.    J. M. LARSON    2,266,772
TEMPERATURE CONTROL SYSTEM
Filed Jan. 6, 1937    6 Sheets-Sheet 3

Inventor:
John M. Larson
By Ambs, Thiess, Olson & Mecklenburger
Attys.

Dec. 23, 1941.   J. M. LARSON   2,266,772
TEMPERATURE CONTROL SYSTEM
Filed Jan. 6, 1937   6 Sheets-Sheet 5

Inventor:
John M. Larson
By Ams, Thiess, Olson & Mecklenburger
Attys.

Dec. 23, 1941.   J. M. LARSON   2,266,772
TEMPERATURE CONTROL SYSTEM
Filed Jan. 6, 1937   6 Sheets-Sheet 6

Inventor:
John M. Larson
By Amb, Thiess, Olson, Mecklenburger
Attys.

Patented Dec. 23, 1941

2,266,772

UNITED STATES PATENT OFFICE 2,266,772

TEMPERATURE CONTROL SYSTEM

John M. Larson, Chicago, Ill., assignor, by mesne assignments, to Minneapolis-Honeywell Regulator Company, Minneapolis, Minn., a corporation of Delaware Application January 6, 1937, Serial No. 119,294

4 Claims. (Cl. 257—3)

This invention relates to temperature control systems, and more particularly to temperature control systems whereby the temperature of a room or other space to be heated may be kept substantially uniform regardless of variations in outdoor temperature or other conditions which might affect the temperature of the room.

The invention further relates to a system whereby the temperature of a plurality of rooms may be controlled in such a manner that a different temperature may be maintained in each room in accordance with the individual requirements of each room and regardless of variations in outdoor temperature; that is, the invention not only contemplates a control system including a plurality of temperature-responsive devices cooperatively functioning under different conditions of varying temperature to maintain a predetermined temperature in a single room such as a restaurant, public hall, or the like, but also provides a system whereby a plurality of rooms may each be maintained at a desired predetermined temperature.

The invention may be used in connection with air conditioning means, or in any suitable circulating system in which air is circulated through a room having air conduits communicating therewith, and in which a controllable amount of outdoor air or suitably humidified air is admitted to the circulating system.

It is an object of the invention to provide a thermostatically controlled system in which the room temperature is maintained at a predetermined degree in accordance with the temperature of the circulating air and the temperature of the outdoor air admitted to the circulating system.

A further object is the provision of a system in which variations in a cold air thermostat are automatically indicated in connection with a circulating system thermostat arranged to control the temperature in accordance with the condition of both thermostats.

A further object is the provision of a temperature control system of the character described in which a heating system is provided for winter use, and a refrigerating system for summer use, and in which a thermostatic control is associated therewith whereby either the heating or cooling device may be brought into operation in accordance with variations in the outdoor temperature registered by the cold air thermostat and in accordance with indoor requirements.

A further object is the provision of a pneumatic system for variably controlling the heating and cooling mediums, in which the pneumatic pressure is controlled by a plurality of thermostats cooperatively functioning under different variable temperature conditions to cause the heating and cooling means to function over extremely wide temperature ranges. Also, wherein the variable control is automatically switched from cooling to heating or vice versa in accordance with requirements without disturbing the effectiveness of the various control elements whereby a substantially constant predetermined temperature may be maintained.

Suitable adjustments are also provided whereby the temperature-responsive elements as well as all elements controlled thereby or cooperating therewith may function automatically to maintain predetermined temperatures in accordance with all normal winter and summer heating and cooling requirements.

It is well known that when extreme high outdoor temperatures prevail it is desirable, in order to prevent physical shock and discomfort in an air cooled room, that the temperature in the room should vary in a predetermined relationship with the variations in the outdoor temperature; that is, it is usually desirable that the room temperature should never be more than from ten to fifteen degrees below the outside temperature and should vary in accordance with the outside temperature.

It is therefore an object to provide a control system wherein the range of the temperature-responsive means controlling the cooling medium is automatically varied in accordance with variations in outside temperature whereby a predetermined relationship between indoor and outdoor temperatures may be maintained.

Further objects of the invention will be apparent from the specification and the appended claims.

Figure 1:
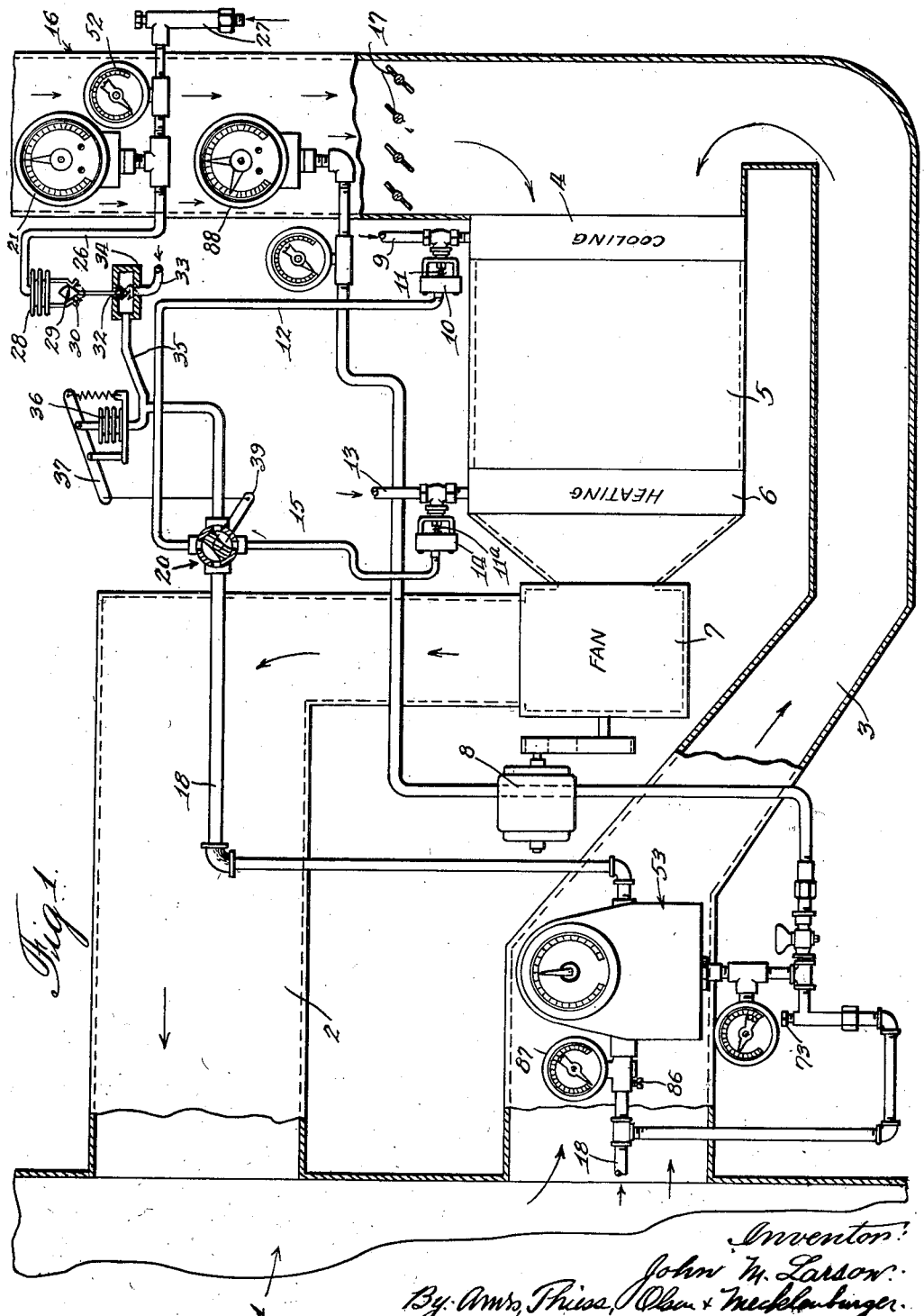
Figure 1 is a somewhat diagrammatic view of one embodiment of the improved temperature control system as installed in connection with a room or other space in which it is desired to control the temperature.
Figure 2:
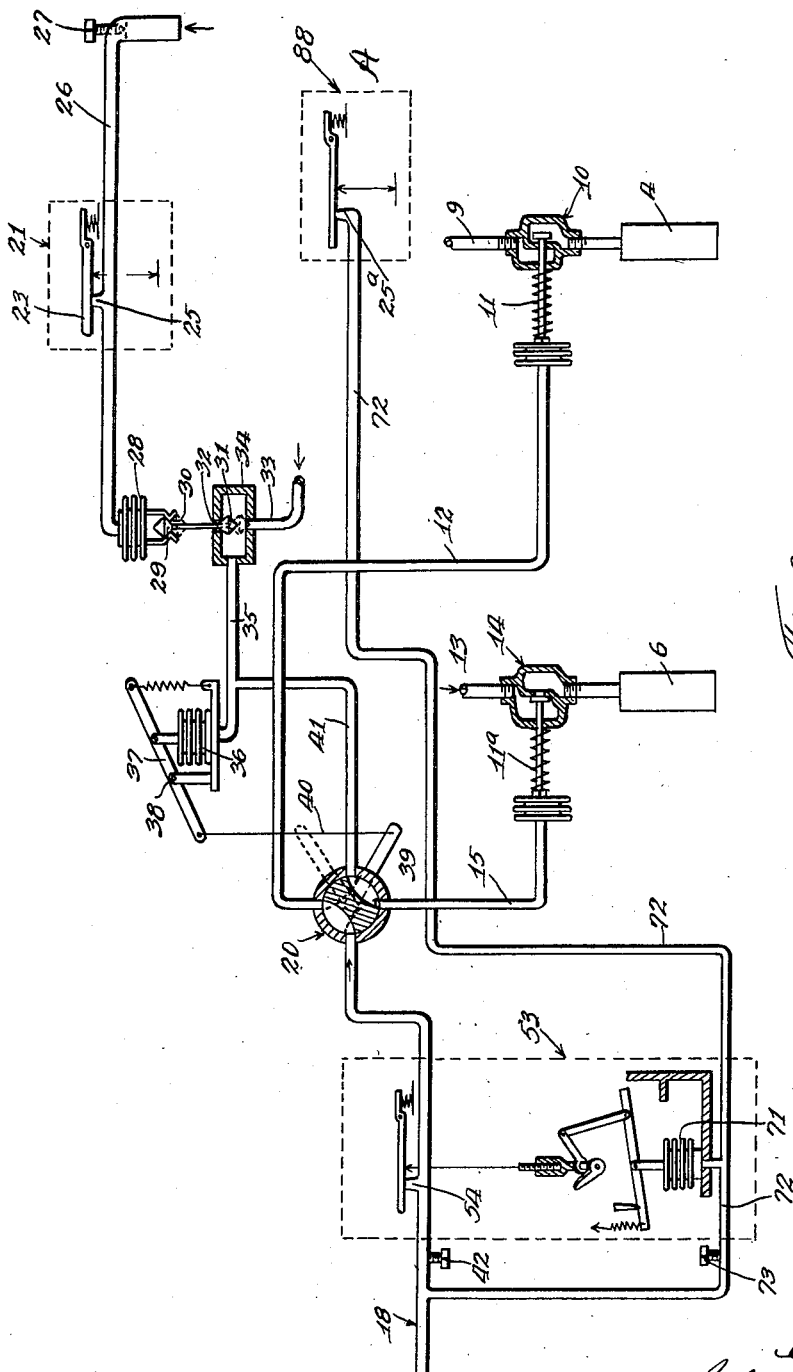
Fig. 2 is a diagrammatic view of the control system shown in Fig. 1 and illustrates the relationship and cooperative functioning of the various control elements.

Referring to the drawings in detail, the embodiment illustrated diagrammatically in Figs. 1 and 2 comprises a room or other space 1 in which the temperature is to be controlled. The circulating system comprises an inlet conduit or duct 2 for directing air into the room and an outlet duct 3 for directing the air from the room. The outlet duct 3 is arranged to direct the circulating air through a cooling device 4, an intermediate chamber 5, and a heating device 6, and from this heating device to a fan 7, the outlet of which communicates with the inlet conduit 2 so that the normal circulation is in the direction of the arrows as shown. The fan 7 may be operated in the usual manner by means of a motor 8. It will be apparent that when the fan is in operation, air will be drawn from the room through the outlet conduit 3, through the cooling device 4, and heating device 6, and forced by the fan into the room through the inlet duct 2.

The cooling means 4 may comprise any suitable device such as a plurality of coils or other means through which a cooling medium may be circulated by means of an inlet pipe 9 leading thereto, and the cooling medium may be suitably controlled by means of a pressure operated valve 10. This valve 10 may be any suitable type, preferably a so-called reverse acting diaphragm or bellows operated valve wherein the valve is normally retained closed by means of a spring 11 and may be opened by air pressure applied to the diaphragm through a conduit 12. The flow of cooling medium may be varied to conform with temperature requirements by varying the air pressure on the diaphragm and the air pressure may automatically be controlled by a plurality of interrelated temperature-responsive elements which will be described later.

The heating element 6 may be somewhat similar to the cooling device; that is, it may contain the usual heating coils to which steam or other heating medium is supplied by means of an inlet conduit 13, the flow of heating medium being controlled by means of a suitable air-pressure controlled valve 14. This valve may be similar in structure to that used for controlling the cooling medium, except that it is preferably a so-called direct-acting valve; that is, the valve is arranged so that the spring 11a normally retains the valve open, and air pressure directed to the diaphragm through a conduit 15 tends to close the valve, and thereby vary the flow of heating medium, or the valve may be completely closed when sufficient air pressure is applied.

In an installation of this type, it is desirable to admit a certain percentage of outdoor air into the circulating system. This is accomplished by means of a conduit 16, one end of which may communicate with the outside air, and the other end may communicate with the cooling and heating devices previously described whereby air is directed therethrough and into the circulating system. The flow of air in this conduit 16 may be controlled as desired by the usual manually operated dampers 17. By this means any desired percentage of outdoor air may be admitted.

In order to control the cooling and heating elements 4 and 6, respectively, in accordance with predetermined temperature requirements, a suitable thermostat controlled air-pressure system is arranged to selectively and variably operate the valves so that the cooling element may automatically be controlled during the summer when high temperatures prevail, and the cooling medium may be shut off and the heating element brought into operation for winter use when low temperatures ordinarily prevail.

The entire heating system, including air circulating ducts, the pressure conduits, and the various thermostats and other control elements, is illustrated diagrammatically in Fig. 1, and the pressure system and thermostatic controls therefor are illustrated diagrammatically but somewhat more completely in detail in Fig. 2.

Referring particularly to Fig. 2, the pressure system for controlling the cooling and heating valves 10 and 14, respectively, comprises a pressure main 18 which receives air pressure from any suitable source. In practice, the air pressure is preferably approximately 15 pounds per square inch, although any suitable pressure may be used. The pressure main 18 communicates with a four-way valve 20. This valve is arranged to be moved to either of two positions, one of which is illustrated in dotted lines, whereby pressure from the main 18 may be directed either to the branch conduit 12 leading to the cooling valve 10 when the valve is in full line position, or when the valve is moved to the dotted line position, the pressure will be directed to the branch conduit 15 leading to the heating control valve 14.

With the parts in the full line position illustrated in Fig. 2, the cooling valve 10 may be controlled to provide a suitable cooling medium whereby the circulating air may be cooled during the summer. That is, when high temperatures prevail, the four-way valve 20 will be moved to the position illustrated whereby the pressure from the main 18 is directed to control the cooling valve 10 in accordance with high temperature variations. When the outside temperature lowers to a predetermined degree, suitable thermostatically controlled mechanism is provided whereby the valve 20 is moved to the dotted line position, and the cooling valve 10 is then shut off and the pressure main is connected with the branch conduit 15 whereby the heating valve 14 may be controlled in accordance with low temperature variations.

Figure 6:
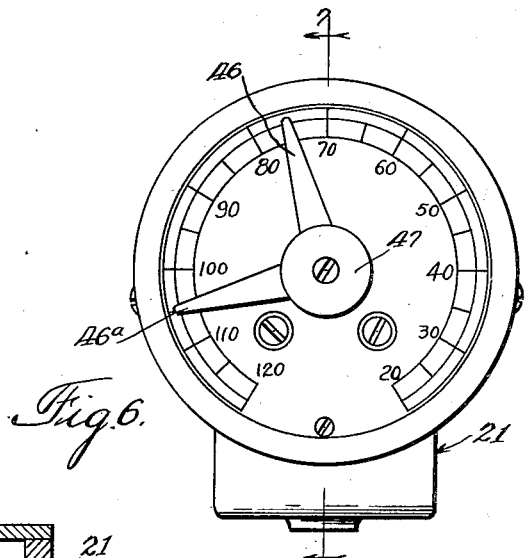
Fig. 6 is a front elevation of one of the cold air thermostats.
Figure 7:
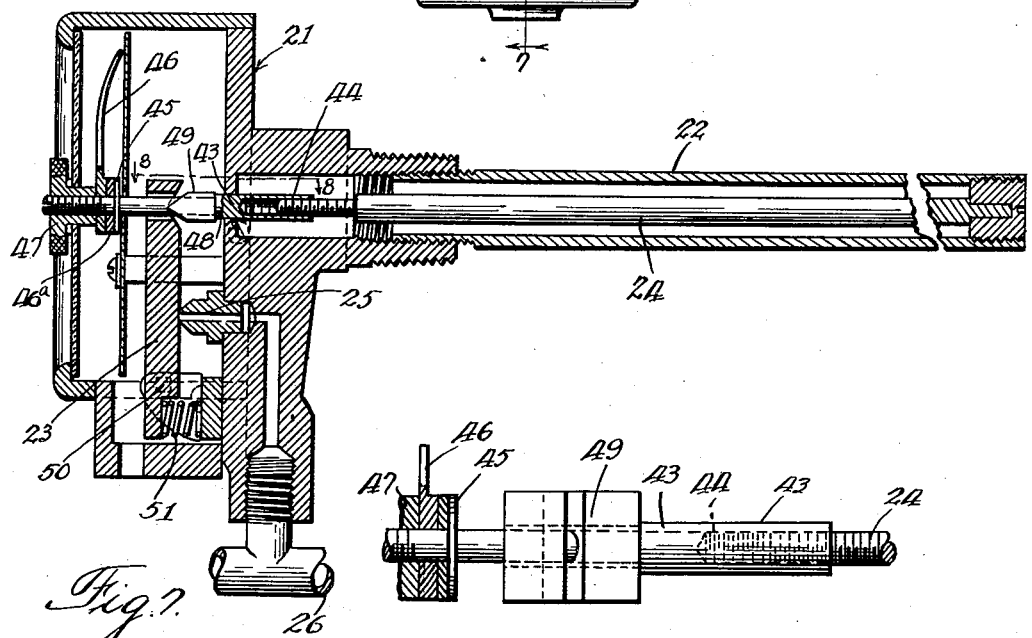
Fig. 7 is a vertical longitudinal section through the embodiment illustrated in Fig. 6 and is taken on a line substantially corresponding to line 7—7 of Fig. 6.
Figure 8:
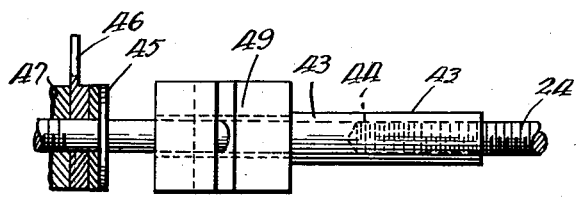
Fig. 8 is a top view of the knife-edge bearing for the push-rod used in the thermostats illustrated in Figs. 3 to 7, inclusive.
Figure 9:
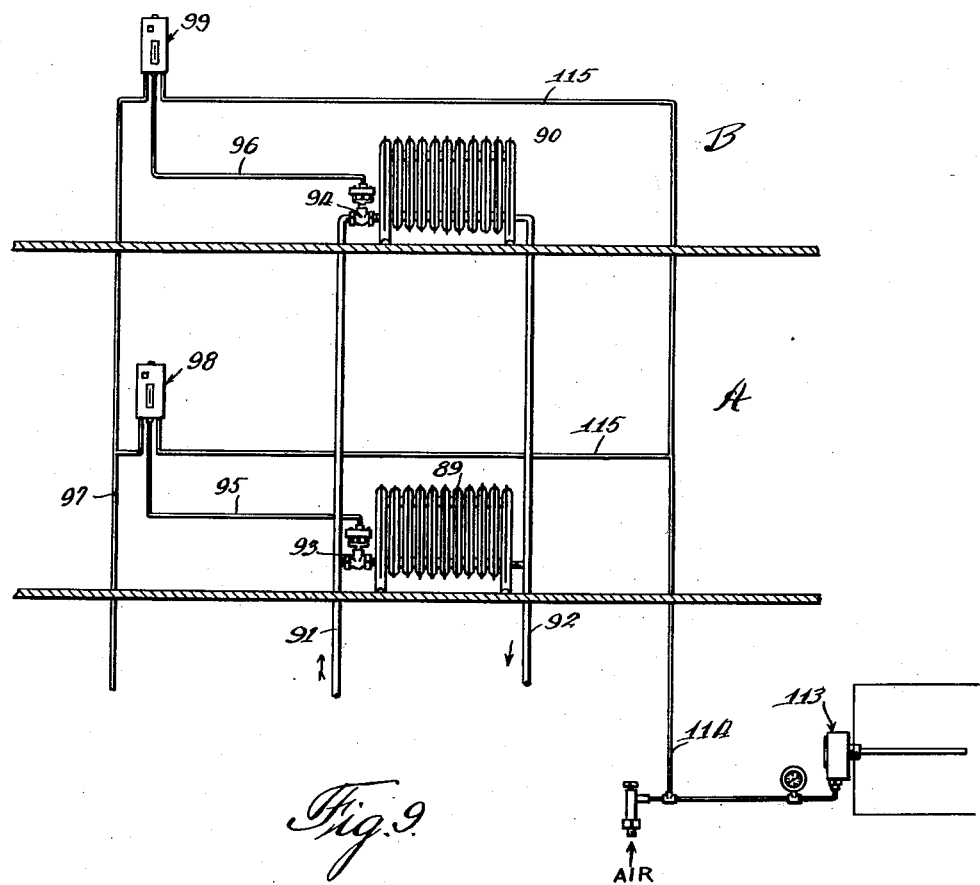
Fig. 9 is a diagrammatic view of an embodiment of the invention as applied to radiator systems for controlling the temperature of one or more rooms.

In order to move the valve 20 and switch the control from cooling to heating, and vice versa, as required, a suitable thermostatic control is provided which comprises a thermostat 21 mounted adjacent the outdoor air inlet 16 (Fig. 1) and which may be of a type similar to that illustrated in detail in Figs. 6, 7, and 8. This thermostat 21 is preferably provided with an elongated temperature-responsive tube 22, which extends into the outside air duct 16, the contraction and expansion of which operates a spring-pressed valve lever 23 by means of the usual push-rod 24 to open and close a vent 25 in a pressure conduit 26. The pressure conduit 26 may be connected to the pressure main 18 or may receive pressure from any suitable source through a restricting valve 27. The valve 27 may be adjusted to restrict the amount of air passing to the conduit 26.

The pressure conduit 26 communicates with a snap valve device comprising a diaphragm or bellows 28 having downwardly-extending spring members 29 thereon. These spring members are arranged to be moved by the contraction and expansion of the bellows 28 and engage a double-cone shaped member 30 which forms an extension of a valve 31, which latter controls an exhaust opening 32 and a pressure inlet 33 in the valve casing 34. The pressure inlet 33 may be supplied with air pressure from any suitable source. The thermostat 21 is arranged for effective operation over a comparatively narrow range, preferably not more than three degrees, whereby the vent 25 will be completely closed when the temperature in the conduit 16, which is approximately outdoor temperature, reaches a predetermined degree which, for example, may be 55°, and the vent will be completely open when the outdoor temperature drops to 52°; that is, at all temperatures above 55° the vent 25 will be completely closed and pressure will be applied to the bellows 28 to retain the valve 31 in the position shown whereby exhaust port 32 is closed and pressure is admitted through the valve casing 34 to a conduit 35 leading from the casing and which communicates with a bellows 36, which bellows is in turn arranged to operate a lever 37 pivoted at 38 and connected to an arm 39 on the valve 20 by means of a link 40. It will therefore be apparent that when the temperature in the outside conduit 16 is at or above 55° the vent 25 will be closed and pressure will be admitted to the controlling bellows 36 to retain the valve 20 in the position illustrated whereby pressure is directed from conduit 18 through branch conduit 12 to control the cooling valve 10.

The pressure conduit 35 also communicates with the four-way valve 20 by means of a branch conduit 41 as illustrated, whereby when the parts are in the position shown, pressure is admitted through the conduit 35, the branch 41, and the branch 15 to the bellows or diaphragm of the heating valve 14, and this valve will therefore remain closed as long as the temperature remains above 55°.

When the temperature drops below 55° the thermostat 21 will start to open the vent 25, and when the temperature reaches 52° the vent will be completely open and the bellows 28 of the snap valve will be completely contracted and the valve 31 will then be in the dotted line position shown whereby the pressure inlet 33 to the casing 34 is closed and the exhaust port 32 is open. The opening of the exhaust port 32 will permit the bellows 36 to collapse, thereby raising the arm 39 of the selector valve 20 and moving the valve to the position shown by dotted lines whereby the pressure conduit 18 will communicate with the heating valve 14, which may thereby be opened an amount corresponding to temperature requirements, and may be controlled by suitable thermostatic devices in a manner which will be described later.

When the selector valve 20 is moved to the dotted line position, the branch conduit 12 leading to the cooling valve 10 is thereby connected to the conduit 41, which at that time is open to the exhaust port 32 in the snap valve casing 34. This release of pressure in the branch conduit 12 permits the spring 11 to close the cooling valve 10, thereby shutting off the cooling medium, and the heating medium may then be controlled in accordance with low temperature requirements. It will therefore be seen that the system is automatically controlled by means of the thermostat 21 whereby the cooling medium is turned on and functions above a predetermined degree of temperature, and this cooling medium is turned off and the heating medium is turned on and functions at all temperatures below a predetermined degree. It will also be obvious that each of the valves 10 and 14 are controlled by pressure from the single pressure main 18. The pressure main 18 may be provided with an adjustable restriction valve 42 whereby the volume of air under pressure may be controlled in either of the branch lines 12 and 15 when either is in selected controlling relation.

As previously stated, the thermostat 21 is illustrated in detail in Figs. 6, 7, and 8, and may comprise the usual temperature-responsive tube 22 and push-rod 24 associated therewith. This push-rod 24 is provided with an elongated extension 43 threaded on the end of the push-rod at 44 and extending outwardly through the dial of the thermostat as shown. This extension rod is provided with a shoulder 45 against which is clamped a pointer 46 by means of a threaded nut 47. The inner end of the rod 43 is enlarged to provide a shoulder 48 against which is seated a knife-edge member 49. This knife-edge member 49 is loosely mounted on the extension 43 and engages the end of the valve lever 23, which lever is arranged to control the vent opening 25. The vent control lever is pivoted at 50 and is normally retained in vent-closing position by means of a spring 51. The vent 25 communicates with the conduit 26 whereby when the vent 25 is opened the pressure in the conduit 26 is relieved and permits the bellows 28 of the snap valve to collapse. The pointers 46 and 46a indicate the temperature limits between which the thermostat will operate. A pressure gauge 52 (Fig. 1) may be provided, which will at all times indicate the pressure in the conduit 26. As previously stated, this thermostat is arranged to function to open and close the vent 25 over a very short temperature range, preferably about three degrees, and it will be apparent that, while in practice it is sometimes desirable to maintain this range between 52° and 55°, the effective range of operation may be changed as desired by rotating the extension 43, which in effect lengthens or shortens the push-rod 24, thereby causing the knife-edge member 49 to operate the vent-controlling lever 23 at any desired temperature.

As pointed out above the two pointers may be adjusted to indicate the operating range of the thermostat; that is, if the thermostat is set to operate from 52° to 55°, one of the pointers may be set at 52° and the other pointer at 55°, thereby clearly indicating the operating range. This same thermostat, or a similar one, is also used for another important function in the system in which it is desired that the thermostat should function to completely open or completely close a vent over a considerably wider range, and when so used the two pointers 46 and 46a are very desirable, as will be described later.

Figures 3, 5:
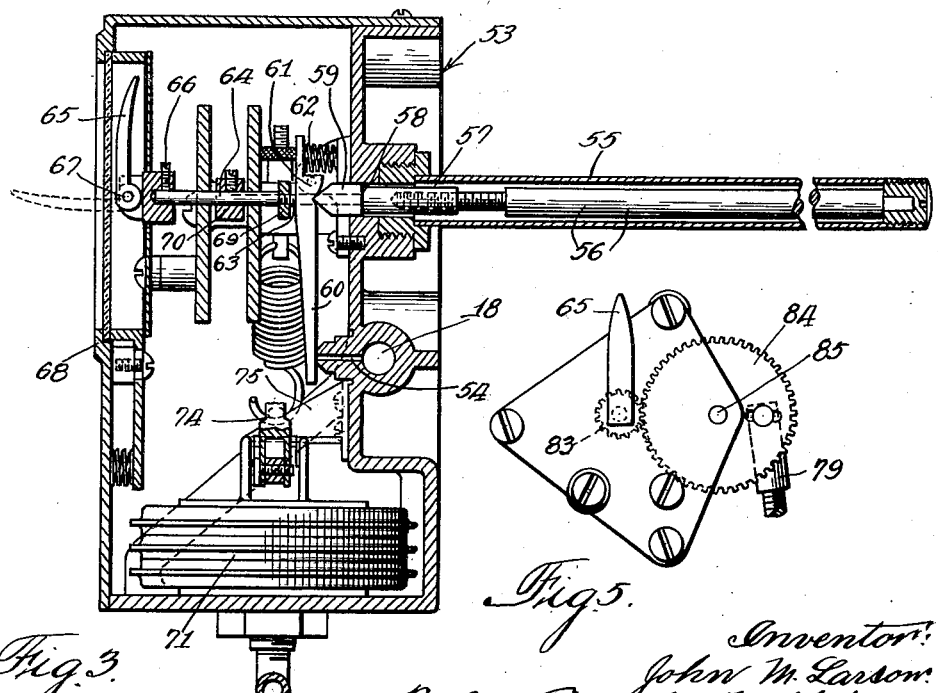
Fig. 3 is a vertical longitudinal sectional view through the so-called sub-master thermostat located in the circulating system and is taken on a line corresponding to line 3—3 of Fig. 4.
Fig. 5 is a slightly modified form of transmission mechanism for controlling the range pointers shown in Figs. 3 and 4.

Referring again to Fig. 2, in order to variably control the valves 10 and 14 by means of pressure from the conduit 18, a so-called sub-master thermostat 53 is provided for controlling a vent 54 in the conduit 18 in accordance with temperature requirements. This sub-master thermostat 53 is illustrated in detail in Figs. 3 and 4 and comprises a tubular temperature-responsive element 55 having the usual push-rod 56 associated therewith as illustrated. This thermostat is somewhat similar in construction to the thermostat 21, in that it is provided with an extension 57 threaded on the push rod 56 and having a shoulder 58 against which rests a loosely mounted knife-edge member 59. This member engages a lever 60 pivoted at 61 and controlled by a spring 62, whereby the lever 60 normally controls a vent 54, previously mentioned, communicating with the air-pressure conduit 18. This air-pressure conduit may extend through the case or frame of the thermostat as illustrated.

Figure 4:
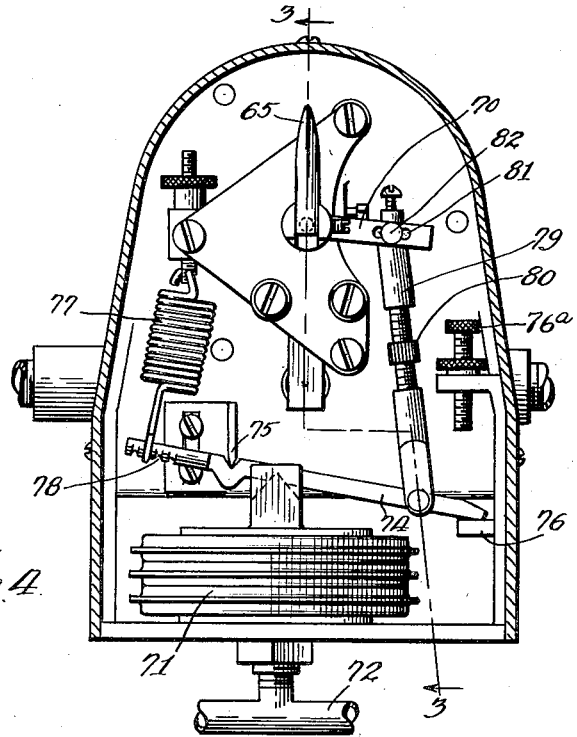
Fig. 4 is a front elevation of the sub-master thermostat illustrated in Fig. 3 with the casing shown in section and the dial removed.

The push-rod extension 57 is provided with a forwardly-extending reduced portion 63, which is threaded to receive a pointer-supporting rod 64, on which a pointer 65 is secured by means of a set screw 66. The pointer 65 is hinged at 67 whereby when the cover 68 of the thermostat is removed, the pointer may be moved outwardly to the position indicated by the dotted lines. The rod 64 may be locked in position on the push-rod extension by means of a lock nut 69. The extension of the push-rod is provided with a laterally-extending arm 70 secured thereto, and extending outwardly as indicated in Fig. 4, and it will be apparent that the effective operating temperature of the thermostat may be varied by raising and lowering this arm to rotate the extension 57, and thereby in effect shorten or lengthen the push-rod. It will also be apparent that as the pointer 65 moves with the arm 70, the effective operating temperature of the thermostat will always be indicated by the pointer 65.

In order to move the arm 70 and thereby vary the operating temperature, a bellows or diaphragm 71 is provided in the base of the thermostat, and is connected to a branch conduit 72 which communicates with the pressure conduit 18 as shown in Figs. 1 and 2. This branch conduit 72 may also be provided with an adjustable restriction valve 73 whereby the volume of air under pressure in the branch line may be controlled. The bellows 71 is arranged to operate a lever 74 (Fig. 4) fulcrumed at 75 and normally retained in the position illustrated with its opposite end resting on a stop 76, by means of a spring 77. The lever 74 is provided with notches 78 whereby the spring 77 may be adjusted to control the resistance of the lever to movement by the bellows 71, and thereby gradually control the operating range of the bellows in accordance with variations in the pressure in the branch conduit 72. The lever 74 is connected to the arm 70 by means of a link 79, the length of which is adjustable by means of a right and left threaded screw 80. The arm 70 is provided with a plurality of holes 81, any one of which may receive the pivotal connection 82 of the link 79. It will be apparent that the thermostat 53 may be adjusted to normally control the vent 54 whereby the vent will be opened and closed over a predetermined range in accordance with temperature requirements of the system and that this temperature range may be automatically varied as desired by controlling the pressure in the branch conduit 72; also that the pointer 65 will always indicate the effective operating temperature of the thermostat. The limits of adjustment of this thermostat are determined by the stops 76 and 76a, these stops serving to prevent the bellows 71 from rotating the adjusting screw beyond a predetermined position in either direction.

It is sometimes desirable to provide a greater than normal range of movement for the pointer 65. This may be accomplished by substituting the embodiment illustrated in Fig. 5 for the lever 70. In this embodiment a pinion 83 is secured to the extension rod 64 on which the pointer is mounted, and a gear 84, or a suitable segment meshing with the pinion, is pivoted at 85 and the link 79 secured thereto in the same manner as the connection is made to the arm 70 in the structure previously described.

The thermostat 53 is mounted adjacent the circulating conduit 3 with the temperature-responsive element 55 extending therein and with the pressure conduit 18 connected in a manner to be controlled by the opening or closing of the vent 54, while the branch conduit 72 is connected in a manner to control the bellows 71. The pressure conduit 18 may be provided with an adjustable restriction valve 86 and a pressure gauge 87.

The thermostat 53 operates preferably over a very narrow range. For example, it may be adjusted so that the vent 54 is completely closed at 75° which is a desirable room temperature. Therefore, as the room temperature as indicated in the circulating system, drops below 75°, the vent 54 will begin to open and this will relieve the pressure in the branch cooling conduit 12 and will allow the spring 11 of the cooling valve 10 to start to close the valve and therefore partially or completely cut off the supply of cooling medium. As this supply of cooling medium is reduced or stopped, the room temperature may rise above 75°, which will cause the thermostat 53 to again close the vent 54, or partially close it, and the pressure in the branch conduit 12 will again be increased and the cooling valve 10 will again start to open, and if the temperature continues to rise, will completely open. By this means the cooling medium may be controlled in accordance with variations in the room temperature.

It is desirable that, as the outdoor temperature rises, the room temperature should be raised accordingly, so that there should be a predetermined relationship between the room temperature and the outdoor temperature in order to prevent physical shock when a person enters or leaves the room; that is, it is usually desirable that the room temperature should not be more than from 10° to 15° lower than the outdoor temperature when high outdoor temperatures prevail. In order to accomplish this result, the operating temperature of the thermostat 53 should be varied in accordance with variations in high outdoor temperatures; that is, as outdoor temperatures rise, the operating range of the thermostat 53 should also be raised, and when the outdoor temperature lowers, the operating range of the thermostat should be relatively lower. A master thermostat 88 is therefore provided, which may be in all respects similar to the thermostat 21, and is mounted adjacent the outdoor inlet conduit 16 with the temperature-responsive element 22 extending therein in the same manner as previously described. This thermostat is preferably arranged to operatively function over a comparatively wide range, preferably a 30° range; that is, in the present instance, in order to correspond with the temperatures previously mentioned, the thermostat 88 is arranged to gradually open and close the vent 25 over a 30° range; for example, the vent may be completely opened at and below 75°, and as the temperature increases the thermostat operates to gradually close the vent until it is completely closed at 105°.

The branch conduit 72 leading to the bellows of the thermostat 53 is extended as shown in Fig. 2, and connected to the thermostat 88 to supply pressure to the vent 25a. The opening and closing of the vent 25a of the thermostat 88 controls and regulates the amount of pressure delivered to the bellows 71 and thereby determines the effective temperature setting on the sub-master thermostat 53 in accordance with the outdoor temperature. Therefore as the outdoor temperature rises above 75°, the vent 25a will start to close and correspondingly increase the pressure in the conduit 72, and the bellows 71 of the thermostat 53 will be accordingly expanded, and the thermostat will be proportionately adjusted to a higher effective operating temperature.

The present invention provides a completely automatically controlled heating and cooling system which is effective over a very great range of temperature, and in which the room temperature, when high outdoor temperatures prevail, may be automatically maintained in automatically variable predetermined relation to the outdoor temperature.

The embodiment illustrated in Figs. 9 to 13, inclusive, is particularly arranged for temperature control of a plurality of rooms wherein each room may be maintained at a predetermined temperature in accordance with the requirements of the particular room, and independently of the other rooms. The system is diagrammatically illustrated in Fig. 9, and is arranged for the control of a suitable cooling medium which is automatically delivered from any suitable source to the radiators or other suitable devices in accordance with temperature requirements. It will be apparent that a combination of heating and cooling elements may be used if desired, and a suitable switching device or selecting means may also be used in a manner similar to that previously described.

The embodiment illustrated comprises individual rooms A and B, although any suitable number of rooms may be controlled. These rooms are provided with radiators 89 and 90 respectively. An inlet 91 is arranged to direct a cooling medium to the radiators, and they are provided with a return conduit 92. The radiators are provided with inlet valves 93 and 94 respectively, which are preferably the usual direct acting valves such as the valve 14 previously described and illustrated diagrammatically in Fig. 2 in connection with the heating element; that is, when pressure is applied to the bellows of these valves they tend to close against the pressure of the spring 11a and when the pressure is relieved the valves open.

The pressure valves 93 and 94 are each provided with branch pressure conduits 95 and 96, respectively, which branch conduits are controlled from a pressure main 97 connected through their respective room thermostats 98 and 99; that is, at predetermined room temperatures the thermostats 98 and 99 operate to admit pressure to their respective branch pressure conduits 95 and 96, whereby the valves 93 and 94 may function to control the flow of cooling medium to the radiators.

Figure 10:
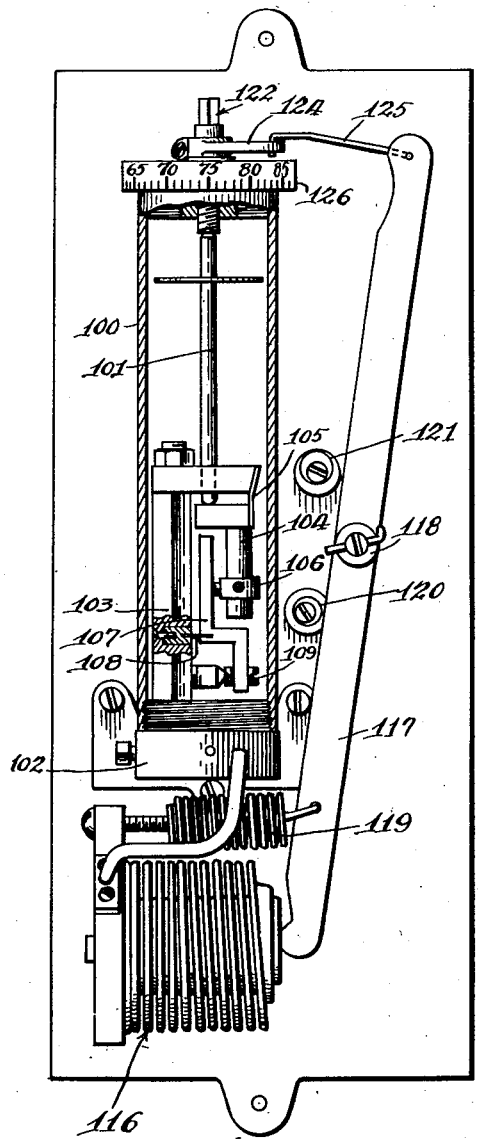
Fig. 10 is a vertical sectional view of the sub-master room thermostats shown in Fig. 9.
Figure 11:
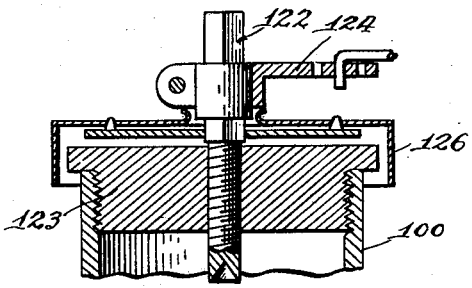
Fig. 11 is a fragmentary sectional view of the upper end of the thermostat illustrated in Fig. 10.
Figure 13:
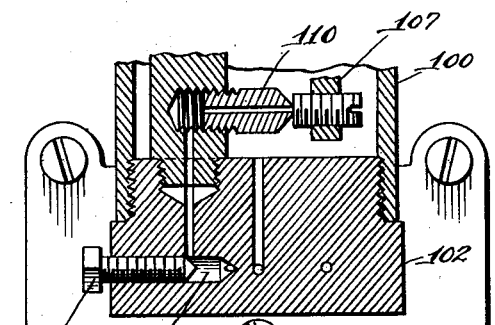
Fig. 13 is a fragmentary sectional view of the lower end of the thermostat shown in Fig. 10 and is taken on a line substantially corresponding to line 13—13 of Fig. 12.
Figure 12:
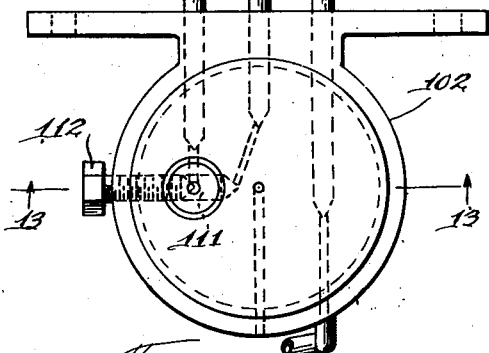
Fig. 12 is a top view of the base of the thermostat illustrated in Fig. 10, and illustrates the various connections thereto.

The thermostats 98 and 99 may be identical in structure and operation, and one of these thermostats is illustrated in Fig. 10 and comprises the usual cylindrical temperature-responsive element 100 having a push-rod 101 associated therewith. The thermostat is provided with a base 102 on which is supported a valve post 103 having a bell crank lever 104 mounted thereon by means of a spring 105, which latter provides a fulcrum for the lever. The lever is provided with an adjustable member 106 slidably mounted thereon, and arranged to operate a valve lever 107 fulcrummed intermediate its length by means of a spring 108 removably supported on the post 103 as shown. The lower end of the lever 107 is provided with an adjustable valve in the form of a screw 109 normally closing a vent 110 communicating with a passage 111. This passage 111 forms a pressure connection between the pressure main 97 and its respective branch pressure conduit 95 or 96, according to the room in which it is installed. A restricting valve 112 is mounted in the base as illustrated to restrict the air volume in the branch line as desired.

It will be apparent that as the room temperature rises the vent 110 will be opened to relieve the pressure in the branch conduit and the radiator valve to which the conduit is connected will tend to open and admit more cooling medium. Also, as the temperature lowers, the vent will gradually be closed and pressure will be admitted to the radiator valve to tend to close the valve. These thermostats preferably operate over a rather narrow range in the same manner as the sub-master thermostat previously described in connection with Fig. 3.

In order to cause these thermostats to vary their effective operating temperature in accordance with variations in high outdoor temperature, a master thermostat 113 is provided which is responsive to variations in outdoor temperature. This thermostat may be mechanically identical with the thermostat illustrated in Fig. 7 and previously described. The vent of this thermostat 113 communicates with a pressure conduit 114 which is provided with branches 115 communicating with the thermostats in the respective rooms. Each of these branch conduits 115 communicates with a bellows 116 mounted on the base of the room thermostat (Fig. 10). The bellows operatively engages a lever 117 pivoted at 118 and normally retained under tension against the bellows by means of a spring 119. Adjustable stops 120 and 121 are provided to limit the movement of the lever within a predetermined range.

A threaded post 122 is mounted in the upper base 123 of the thermostat and engages the end of the push-rod 101 so that rotating this post is equivalent to lengthening or shortening the push-rod 101. The post 122 is provided with an arm 124 secured thereto and adjustably connected to the lever 117 by means of a link 125. A dial 126 is secured to the post 122 in a manner to be rotated therewith and provided with indicia for indicating the setting of the thermostat; that is, the thermostat may normally be set to start to open the vent at 75°. However, variations in the outdoor temperature will control the pressure conduit 114 so that the pressure in the bellows will vary the effective operating temperature of the thermostat and will indicate this temperature on the dial.

Modifications will be apparent to those skilled in the art, and it is desired, therefore, that the invention be limited only by the prior art and the scope of the appended claims.

Having thus described my invention, what I claim and desire to secure by Letters Patent is:

1. In a temperature control system, in combination heating means for heating a space, cooling means for cooling the space, first pressure actuated means for controlling the heating means, second pressure actuated means for controlling the cooling means, one of said pressure actuated devices operating reversely of the other, a thermostat responsive to the demand for heating or cooling of said space, said thermostat being connected to a control line and serving to vary the pressure in said control line in accordance with change in temperature, and selective valve means for selectively connecting said control line to one of said pressure actuated means or the other, said selective valve means also serving to apply pressure to one of said pressure actuated means when the other pressure actuated means is connected to said control line, while relieving pressure from said other pressure actuated means while said one pressure actuated means is connected to said control line.

2. In a temperature control system, in combination heating means for heating a space, cooling means for cooling the space, first pressure actuated means for controlling the heating means, second pressure actuated means for controlling the cooling means, one of said pressure actuated devices operating reversely of the other, a thermostat responsive to the demand for heating or cooling of said space, said thermostat being connected to a control line and serving to vary the pressure in said control line in accordance with change in temperature, selective valve means for selectively connecting said control line to one of said pressure actuated means or the other, said selective valve means also serving to apply pressure to one of said pressure actuated means when the other pressure actuated means is connected to said control line, while relieving pressure from said other pressure actuated means while said one pressure actuated means is connected to said control line, a pressure actuated device for adjusting the setting of said thermostat, and a thermostat influenced by outside temperature for varying the pressure applied to said pressure actuated device.

3. In a temperature control system, in combination heating means for heating a space, cooling means for cooling the space, first pressure actuated means for controlling the heating means, second pressure actuated means for controlling the cooling means, one of said pressure actuated devices operating reversely of the other, a thermostat responsive to the demand for heating or cooling of said space, said thermostat being connected to a control line and serving to vary the pressure in said control line in accordance with change in temperature, selective valve means for selectively connecting said control line to one of said pressure actuated means or the other, said selective valve means also serving to apply pressure to one of said pressure actuated means when the other pressure actuated means is connected to said control line, while relieving pressure from said other pressure actuated means while said one pressure actuated means is connected to said control line, a pressure actuated device for actuating said valve, a pressure actuated device for adjusting said thermostat, and means influenced by outside temperature for varying the pressure applied to said pressure actuated devices.

4. In a combined heating and cooling system, in combination, means for heating and means for cooling a space to be conditioned, pressure operated controlling means for varying the operation of said heating means, pressure operated controlling means for varying the operation of said cooling means, a single thermostatic valve responsive to the demand for heating or cooling, connections between said thermostatic valve and said pressure operated controlling means, selective means for rendering said thermostatic valve device operative to control said heating or said cooling means selectively and for rendering ineffective the heating or cooling means not so controlled, means for adjusting said thermostatic valve, and temperature responsive means for controlling said adjusting means and for actuating said selective means at a predetermined temperature, said temperature responsive means acting when heating is required to cause said selective means to render said thermostatic valve operative to control heating and to cause said adjusting means to adjust said thermostatic valve to maintain a temperature which is suitable for heating, said temperature responsive means acting when cooling is required to cause said selective means to render said thermostatic valve operative to control cooling and to cause said adjusting means to adjust said thermostatic valve for maintaining a temperature higher than maintained when heating is required.

JOHN M. LARSON.